United States Patent [19]

Rohner et al.

[11] 4,146,967
[45] Apr. 3, 1979

[54] ROTOR BLADE INSPECTION FIXTURE

[75] Inventors: Martin J. Rohner, Springfield; George Olszewsky, Ridley Park; Harry W. Hamilton, Broomall, all of Pa.

[73] Assignee: The Boeing Company, Seattle, Wash.

[21] Appl. No.: 824,405

[22] Filed: Aug. 15, 1977

[51] Int. Cl.² .......................... G01B 5/24; G01B 5/20; G01B 7/30; G01B 7/28
[52] U.S. Cl. ................................. 33/174 C; 33/174 L; 33/174 P
[58] Field of Search ............. 33/174 C, 174 L, 174 P, 33/174 PA

[56] References Cited

U.S. PATENT DOCUMENTS

| 2,451,155 | 10/1948 | De Boer et al. | 33/174 P |
| 2,648,912 | 8/1953 | Osgood | 33/174 P |
| 2,703,456 | 3/1955 | Smyth | 33/174 P |

FOREIGN PATENT DOCUMENTS

| 661230 | 6/1938 | Fed. Rep. of Germany | 33/174 C |
| 1032557 | 12/1954 | Fed. Rep. of Germany | 33/174 P |
| 773088 | 4/1957 | United Kingdom | 33/174 P |

Primary Examiner—Richard R. Stearns
Attorney, Agent, or Firm—Robert S. Lipton; Jack D. Puffer; Eric Neitzke

[57] ABSTRACT

An apparatus for measuring the contour of rotor blades is provided. The apparatus or fixture of the present invention will measure airfoil shape and twist at any spanwise station along a rotor blade as well as measuring the chordwise and flapwise bow of the rotor blade. The fixture includes a base to which the blade is secured. A plate or templet like device is placed about the blade. The plate is secured to a carriage which is movable along the base so that it may traverse the blade along its span. Transducers connected to the plate measure the airfoil contour at particular spanwise stations. The plate is mounted to the carriage in such a manner that its rotation, vertical, and horizontal displacement may be measured and hence the twist, chordwise and flapwise bow may be determined.

13 Claims, 9 Drawing Figures

ROTOR BLADE INSPECTION FIXTURE

BACKGROUND OF THE INVENTION

This invention relates to a fixture for measuring the contours of a helicopter rotor blade in general and airfoil shape and twist at a particular section and spanwise and chordwise bow along the blade span in particular.

As is well known, to those skilled in the art, small differences in shape and contour can have significant effects in aerodynamic bodies such as wings, propellers, and helicopter rotor blades. Aerodynamicists and manufacturers of such products consume great amounts of time and resources determining the shape or contours of such bodies. In many cases, for example a wing, the contours are predetermined by a variety of techniques and a wind tunnel model is then made in accordance with those contours. It is necessary to inspect the contours of the resultant model so that it may be ascertained if the model was in fact made in accordance with the predetermined contours. To a lesser extent some aerodynamic bodies are built in a wind tunnel by a trial and error method whereupon finding a desired result the contours of the body must then be measured.

In production of an aircraft, such as a helicopter, each rotor blade which is manufactured must be inspected in order to determine whether or not it conforms to the design contours. Particularly, the airfoil sections along a rotor blade span must be manufactured within specific tolerances. Inspection is made more difficult as the airfoil sections vary in shape along the span. Additionally, the twist or angle of each airfoil section with respect to a base or reference airfoil section must be inspected, as must the flapwise and chordwise bow of the rotor blade. Flapwise bow may be defined as the deviation of the rotor blade pitch axis in the plane of rotation of the rotor blade, while chordwise bow may be defined as the deviation of the pitch axis from the plane of rotation.

In actual practice the inspection of aerodynamic bodies in general and helicopter rotor blades in particular have been accomplished with varying degrees of success and efficiency. The airfoil shape at a particular spanwise section has most commonly been inspected through the use of templets having the shape of the desired contour or having a known deviation therefrom. The appropriate templet is placed about the rotor blade at the desired spanwise point and a visual inspection is made to determine if the blade contour matches the templet contour appropriately. This has proven to be a time consuming and inaccurate procedure.

Twist of rotor blades has been determined, also by using templets, by measuring the position of the templet with respect to a horizontal reference plane.

Chordwise and flapwise bow have been measured through the use of a spanwise templet like fixture. The blade is positioned appropriately with respect to the fixture and inspection is accomplished by manually taking measurements along the blade span.

Problems associated with inspecting aerodynamic bodies are recognized in the prior art. U.S. Pat. No. 3,040,437 to Polidor issued June 26, 1962 discloses an apparatus for measuring the airfoil shape of a turbine blade using a multiplicity of pins. U.S. Pat. No. 3,678,585 to Dabrush, et al. issued July 25, 1972 discloses an inspection apparatus for measuring the equivalent of flapwise bow of a turbine engine. U.S. Pat. No. 2,238,782 to Roche issued Apr. 15, 1941 teaches a fixture for measuring twist and width of an aircraft propeller blade with respect to another blade of the same propeller.

There have been many problems associated with various prior art fixtures in that in general they have been inaccurate. Each of the fixtures has measured only a few of the total number of parameters which require inspection, it thus requires a multiplicity of fixtures to inspect a single aerodynamic body such as a rotor blade. Additionally, these prior art fixtures are time consuming to use and usually provide data only at specific spanwise stations along the wing or blade. This is particularly true with respect to those fixtures that measure airfoil contour of a body having different airfoil contours along the span.

The present invention is particularly suited for accurate inspection or measurement of airfoil contours of helicopter rotor blades. The particular embodiment of the invention described herein is a fixture adapted to inspect particular contours of helicopter rotor blades having a constant chord length at locations along its span. The fixture will also measure the twist of any particular airfoil section with respect to a reference airfoil section. Additionally, the fixture will measure the chordwise and flapwise bow of the rotor blade. Although the embodiment herein described has been adapted for inspection of helicopter rotor blades having a constant chord section, it is to be understood that the invention may also be adapted to provide similar measurements with respect to rotor blades having a variable chord and to aerodynamic bodies other than helicopter rotor blades, such as airplane wings, horizontal stabilizers, etc.

SUMMARY OF THE INVENTION

This invention includes a base having supports at its opposite ends for supporting the rotor blade which is to be inspected. The rotor blade is supported so that its chord plane is substantially vertical.

A trolley is mounted on tracks which are in turn secured to the base so that the trolley may travel along the base and traverse the span of the blade. In operation the particular airfoil section which is to be measured is located in the fixture by properly positioning the trolley along the blade span. Measuring devices, connected to a yaw plate which encompasses and is secured to the blade, measure the location of various points along the airfoil section contour. The remaining measuring components of the invention are connected to the trolley.

Flapwise bow is determined by measuring the displacement of a horizontal carriage mounted on the trolley. The horizontal carriage is mounted to tracks on the trolley so that it may move horizontally with respect to the base and thus, at a right angle to the chord plane of the blade. Flapwise bow of the blade is determined by taking measurements at various airfoil sections along the span. Identical readings at all airfoil sections along the span would indicate no bow or curvature of the blade, when at rest, in the plane of rotation. Of course, in most cases the blade will have some flapwise bow, the precise contour of which will be measured and indicated by a set of different readings.

Chordwise bow is determined by measuring the displacement of a vertical carriage which is mounted to the horizontal carriage. The vertical carriage, as the name indicates, moves vertically with respect to the trolley and the horizontal carriage in a direction parallel to the airfoil chord plane. A uniformity of displacement measurements of the vertical carriage at airfoil sections along the blade span would indicate the lack of any chordwise bow or curvature of the blade, when at rest, in the plane of rotation. Since most blades will have some chordwise bow, this will be indicated by a set of different readings.

Airfoil twist angle and airfoil coordinates are measured through the use of the yaw plate which is mounted to the vertical carriage. The yaw plate, when in the proper position circumscribes the rotor blade. It is secured to the blade so that it is properly indexed to airfoil leading and trailing edges. The angle between a particular airfoil section and a reference airfoil section may be determined by measuring the angle of the yaw plate with respect to the vertical carriage at both positions and obtaining their difference. The airfoil coordinates are determined by measuring the distance particular points on the rotor blade surface are from the airfoil chord line and the distance the points are behind the nose of the airfoil.

Accuracy of the measurements is greatly enhanced through the use of linear transducers. Transducers are located so as to determine the displacement of, the horizontal carriage with respect to the trolley, the vertical carriage with respect to the horizontal carriage, and the yaw plate with respect to the vertical carriage. Transducers are also mounted to the yaw plate so as to take the measurements which are necessary to determine the location of points along the airfoil to thus define it.

In operation the trolley would be positioned so that the yaw plate is at the desired spanwise station. The yaw plate is then appropriately positioned and secured to the blade. Readings are then taken of the transducers mounted to the horizontal and vertical carriages and the position of the yaw plate with respect to the vertical carriage. The measuring apparatus connected to the yaw plate for determining the airfoil contour are moved to the desired points about the blade and measurements are taken. The yaw plate is then unsecured from the rotor blade and the trolley is moved so that the yaw plate is repositioned to the next desired spanwise position along the rotor blade. The yaw plate is then secured to the blade and similar measurements are again taken. In this manner measurements of airfoil coordinates at particular spanwise positions along the blade may be obtained. Additionally, the measurements of twist angle, chordwise and spanwise bow of the blade, are also obtained.

Measurements from the various transducers may be taken manually, or electronically recorded. The electronic recordings may be stored or used directly as input to a computer. In the preferred embodiment of the invention it is contemplated that the transducer output will be recorded electronically for use as computer input so as to enable the user of the data to convert the raw input into any desired format. This is highly important as airfoil data as measured is measured with respect to a particular frame of reference. In many circumstances the aerodynamicists will wish to use a different reference line from that which was used for measuring purposes and may additionally wish to use the data to compute various airfoil parameters which are not directly determinable through measurement, e.g. airfoil mean lines.

Accordingly, it is an object of the present invention to provide a fixture which will accurately and quickly measure the contour of an airfoil.

It is object of the present invention to provide a fixture which will accurately and quickly measure the contour of an airfoil and the degree of twist the airfoil has with respect to the reference airfoil.

It is object of the present invention to provide a fixture which will support a rotor blade and which will accurately and quickly measure the contour of a preselected airfoil section along the rotor blade span.

It is an object of the present invention to provide a fixture which will support a rotor blade and which will rapidly and accurately measure the contour of a predetermined airfoil section along the rotor blade span and measure the degree of twist of that predetermined airfoil section with respect to any other predetermined airfoil section or reference.

It is an additional object of the present invention to provide a fixture which will support a rotor blade and which will measure the chordwise bow of the blade.

It is an additional object of the present invention to provide a fixture which will support a rotor blade and which will measure the flapwise bow of the blade.

It is still a further object of the present invention to provide a fixture which will support a rotor blade and will measure chordwise bow and flapwise bow of the rotor blade.

It is still a further object of the present invention to provide a fixture which will measure the chordwise bow and flapwise bow of the rotor blade and measure the contour of a predetermined airfoil section and measure the degree of twist of that airfoil section with respect to a second predetermined airfoil section.

It is still an additional object of the present invention to provide a fixture which will accurately and quickly measure the contour of an airfoil section using transducers and which will eliminate the manual taking of measurements.

BRIEF DESCRIPTION OF THE DRAWINGS

The construction of the preferred embodiment as well as further objects and advantages of the invention will become further apparent from the following specification when considered with the accompanying drawings in which like numerals refer to like parts wherein.

DESCRIPTION OF THE PREFERRED EMBODIMENT OF THE INVENTION

Reference will now be made in FIGS. 1 and 2 wherein a schematic representation of the present invention is shown. A helicopter rotor blade 2 is shown properly mounted in a fixture of the present invention 4. The fixture 4 includes a base 6, a root end support 8 and a rotor blade and support 10. A pair of parallel tracks 12 are rigidly connected to the base 6. A movable trolley 20 is mounted on the tracks 12. A horizontally movable carriage 30 is mounted to the trolley 20. A vertically movable carriage 40 is mounted to the horizontal carriage 30. A yaw plate 50 is rotatably mounted to the vertical carriage 40. The yaw plate encompasses and is secured to the rotor blade 2. In the schematic representation of the invention 4 depicted in FIGS. 1 and 2 means are included for permitting movement such as bearings or rollers. 14.

In operation a particular spanwise position along the blade is selected and the trolley 20 is positioned so that the yaw plate 50 may be secured to the blade at that desired position. The yaw plate 50 and the trolley 20 are properly positioned at the desired airfoil section along the span of the blade 2 through the use of a scale 32 on the base 6. An index, not shown, is connected to the trolley 20. The index and scale are oriented so that the index will indicate the distance the yaw plate is from the center of rotation of the blade. Although this manual approach to the measurement of the spanwise position of the yaw plate 50 is described herein it is to be understood that various other approaches may be used, including the use of transducers.

In properly securing the yaw plate 50 to the blade vertical and horizontal displacement of the entire yaw plate is made possible by movement of the horizontal carriage 30 with respect to the trolley 20 and movement of the vertical carriage 40 with respect to the horizontal carriage 30. The rotatability of the yaw plate 50 with respect to the vertical carriage 40 permits alignment of the yaw plate with respect to the torsional position of the selected airfoil section.

Relative movement between the trolley 20 and the horizontal carriage 30 is measured through the use of a transducer assembly 16 and a scale 18. The transducer assembly 16 is mounted to the horizontal carriage 30 while the scale 18 is mounted to the trolley 20. The transducer slidably engages the scale. The scale is transparent and has measured markings etched on it. The transducer assembly includes a light source and a photoelectric cell and is adapted to count or measure the number of etched markings which pass by the photoelectric cell when there is relative movement between the transducer 16 and the scale 18. By electronically counting the etched markings which pass the transducer 16 the relative movement of the horizontal carriage 30 and the trolley 20 may be measured.

Although transducer assemblies of the type just described have been used in the preferred embodiment and will be described in further detail hereinafter it is to be understood that there may be different types of distance measuring apparatus which may be used without departing from the spirit of the invention.

In a similar manner the relative vertical movement between the vertical carriage 40 and the horizontal carriage 30 may be determined. The transducer assembly 22 is mounted to the vertical carriage 40, while a scale 24 is mounted to the horizontal carriage 30. The transducer assembly 22 slidably engages the scale 24 thus permitting the relative distance between them to be measured.

The angular relationship between the yaw plate 50 and the vertical carriage 40 is determined by the rotary transducer 26 and the curved track 28. The curved track 28 has teeth or serations thereon and is mounted to the vertical carriage 40. The rotary transducer 26 is mounted to the yaw plate and is of the type which measure the magnitude of the rotation of a gear which forms a part of the transducer. The gear, not shown, engages the curved track 28 so that any relative movement between the curved track 28 and the rotary transducer 26 causes the gear to rotate thus causing the transducer to indicate the magnitude of the relative displacement.

As will be understood in light of the preceding discussion the readings or measurements taken by the transducers 16, 22, and 26 may be used in determining, respectively, flapwise bow, chordwise bow, and twist of the blade 2. In order for this to be accomplished a series of readings from each transducer must be taken when the yaw plate 50 is properly secured to the blade at particular spanwise stations along the rotor blade. For example in FIG. 1 the scale 32 which is mounted to the base 6 is calibrated to read or measure the number of feet from the center of rotation of the blade. By taking the transducer measurements at various points along the blade span by appropriately positioning the trolley 20 chordwise bow, flapwise bow, and twist of the blade may be determined as a function of rotor blade span.

Figure 3:
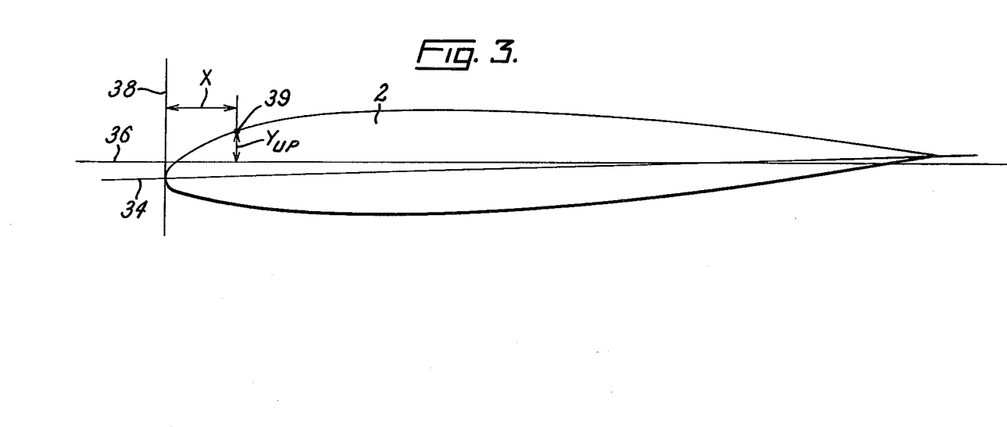
FIG. 3 is a section view of an airfoil of a rotor blade.

Referring now to FIG. 3 wherein an airfoil of arbitrary shape is depicted. Airfoil contours are generally defined with reference to a chord line 34. Chord line 34 is generally defined as a straight line connecting the forward most point on an airfoil section to its trailing edge. In actual practice however, chord lines are sometimes arbitrarily defined. For purposes of the present invention the chord line need not necessarily be used, as any arbitrary reference line such as line 36 may be used. An airfoil may be uniquely described by locating points along the surface of the airfoil with reference to their vertical distance from the reference line 36 and the distance the point is displaced from a reference line 38 which is perpendicular to the reference line 36. It is desirable that the reference line 36 be coincident with the chord line 34 and that the reference line 38 intersect the forward most point of the airfoil section. The distance a particular point 39 is located to the right of the reference line 38 is generally designated X and the distance the point 37 is located above the reference line 36 is designated as $Y_{up}$. If the particular point 39 were located below reference line 36 its distance would be designated $Y_1$. Thus it may be seen that any airfoil may be defined by a table setting forth various points along the airfoil surface in terms of its X and Y coordinates.

Figure 2:
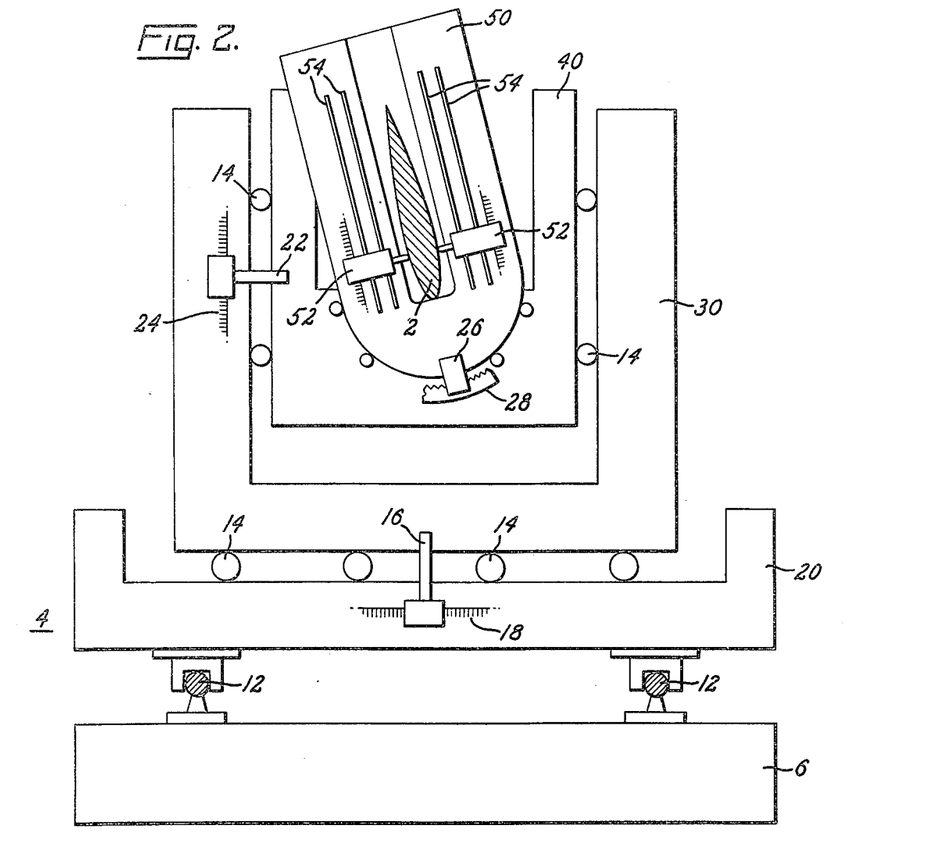
FIG. 2 is a front elevation view of a schematic representation of the present invention.

Referring now to FIG. 2 wherein transducer assemblies 52 are shown mounted to the yaw plate 50. One of the transducer assemblies measures the X and Y coordinates of the upper surface of the airfoil section while the other transducer assembly 52 measures the X and Y coordinates of the lower surface of the airfoil section. The transducer assemblies are slidably connected to the yaw plate.

Figure 4:
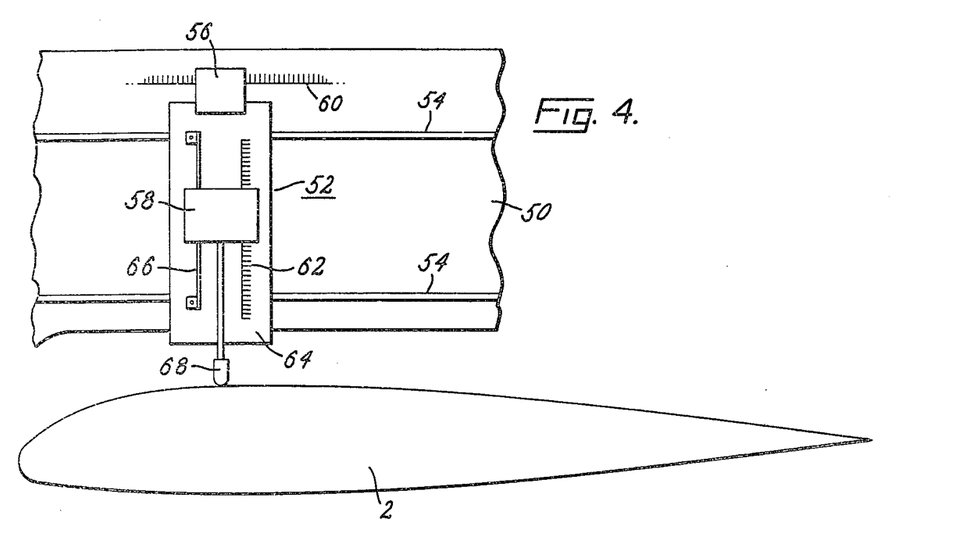
FIG. 4 is an exploded portion of the front elevation view of a schematic representation of the present invention showing the interface between an airfoil section and the contour measuring components of the present invention.

Referring now to FIG. 4 wherein one of the transducer assemblies 52 is shown. Tracks 54 are shown secured to the yaw plate 50. The transducer assembly 52 includes transducers 56 and 58. The transducer 56, which is connected to a platform 64, slidably engages a scale 60 which is secured to the yaw plate 50. The transducer 58 slidably engages a scale 62 which is secured to a platform 64. The platform 64 slidably engages tracks 54. The transducer 58 slidably engages a rod 66 which is also secured to the platform 64. Connected to the transducer 58 is a probe 68 for following the contour of the rotor blade 2.

As the platform 64 is moved along the tracks 54 the transducer 56 will indicate the magnitude of the relative movement of the platform 64 with respect to the yaw plate 50. Thus it is apparent that transducer 56 may be calabrated to read the X position of the probe 68. As the platform 64 is moved along the track 54 the probe 68 will follow the contour of the rotor blade 2 thus causing the transducer 58 to move along rod 66 and the scale 62. Thus the transducer 58 may be calibrated to read the Y position of the probe 68. Thus it may be seen that with appropriate recording equipment the upper contour of the rotor blade, at the selected spanwise station, may be determined simply by passing the platform along the tracks 54 so that the probe 68 will traverse the upper surface of the blade 2 from its leading edge to its trailing edge. Of course the contour of the lower portion of the blade may be obtained in a like manner using the identical remaining transducer assembly 52 located on the other side of the blade.

Figure 1:
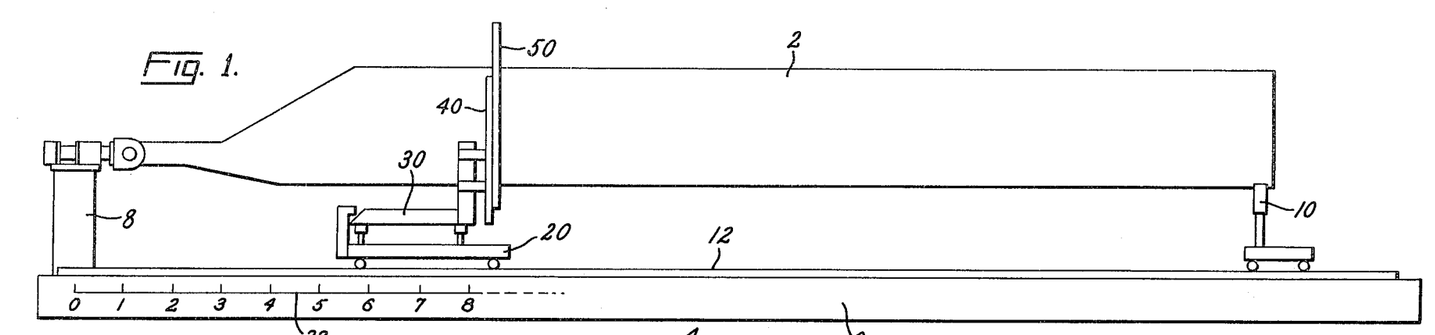
FIG. 1 is a side elevation view of a schematic representation of the present invention.
Figure 5:
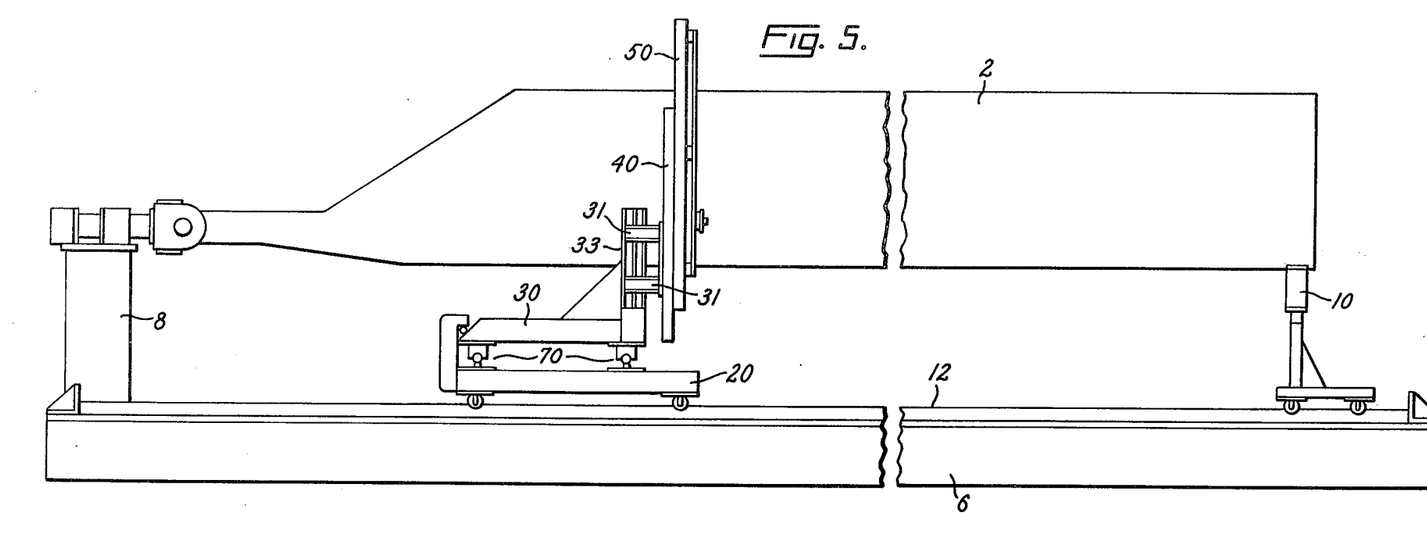
FIG. 5 is a side elevation view of the preferred embodiment of the present invention.

In order to simplify the description of the invention the schematic drawings shown in FIGS. 1,2 and 4 have been used. The preferred embodiment of the invention is shown in FIGS. 5,6,7, 8 and 9. Referring now to FIG. 5. A base 6 is shown including track 12. A blade 2 is supported at its root end by a support 8 and at its tip by a support 10. The horizontal carriage 30 is mounted to the trolley 20 by bearings 70. The vertical carriage 40 is mounted to the horizontal carriage so that it may move in a vertical direction. The yaw plate 50 is pivotally mounted to the vertical carriage 40.

Figure 6:
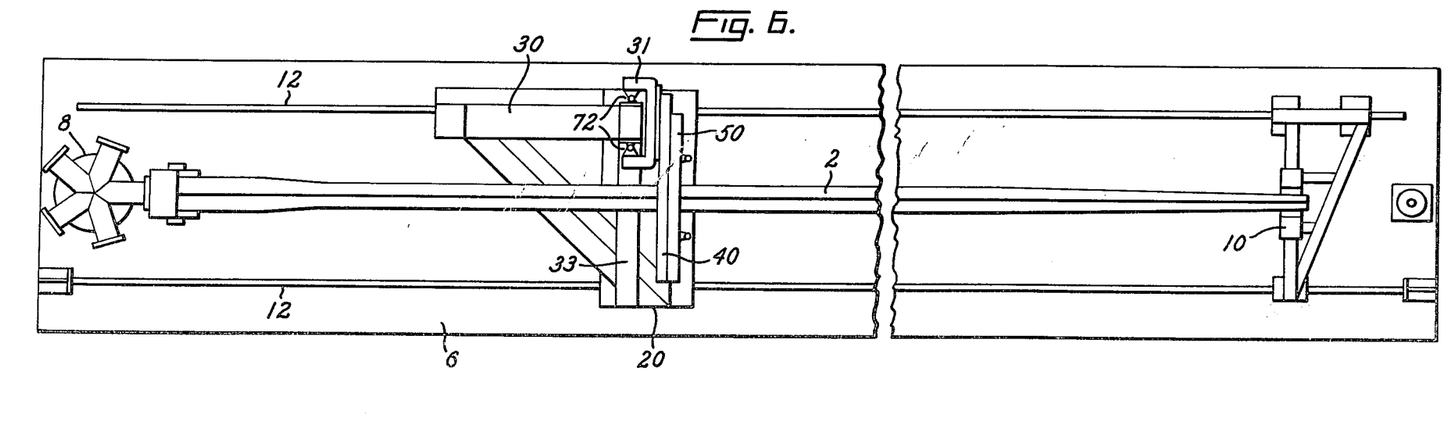
FIG. 6 is a top elevation view of the preferred embodiment of the present invention shown in FIG. 5.
Figure 7:
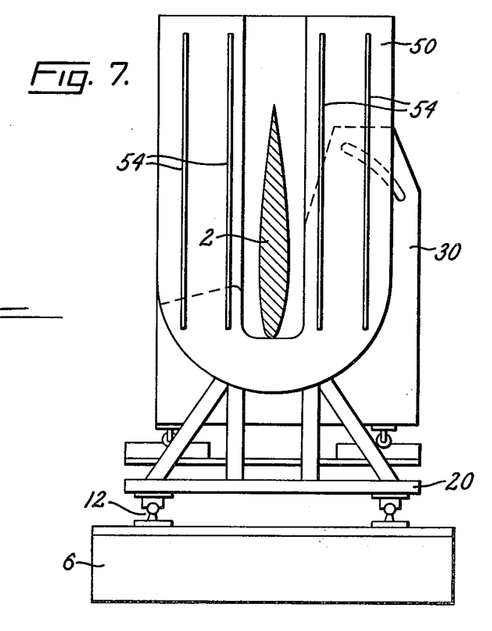
FIG. 7 is a front end elevation view of the preferred embodiment of the present invention shown in FIGS. 5 and 6.

Additionally details of the trolley 20, the horizontal and vertical carriages 30 and 40, and the yaw plate 50 may be seen in the top and end elevation views of the preferred embodiment of FIGS. 6 and 7 respectively. Arms 31 which form a part of the vertical carriage 40 slidably engages a vertical member 33 which forms part of the horizontal carriage 30. It may be seen that the vertical carriage 40 moves with respect to the horizontal carriage 30 by virtue of being mounted thereto by bearings 72 mounted to arms 31. The yaw plate 50 is pivotally mounted to the vertical carriage 40 by any suitable manner.

Figure 8:
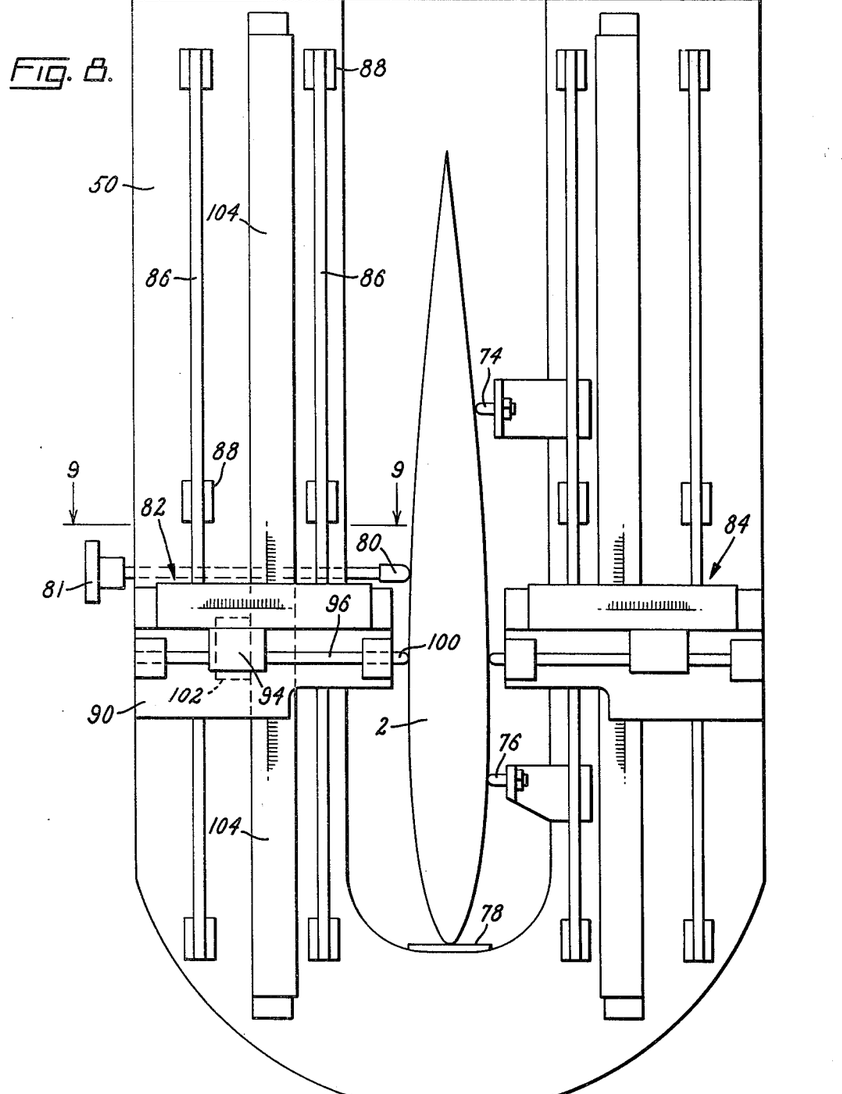
FIG. 8 is an exploded view of the yaw plate and rotor blade shown in FIG. 7.

The yaw plate 50 and the manner in which it is secured to the rotor blade 2 is shown more clearly in FIG. 8 which is a view of the yaw plate 50 taken from the rotor blade tip. The rotor blade 2 is secured to the yaw plate 50 by placing the blade against the adjustable vertical stops 74 and 76 and positioning stop 80 against the opposite side of the blade. Stop 80 is positioned using handle 81. The leading edge of the blade abuts the bottom stop 78 and is held there by the weight of the blade. Stops 74 and 76 are movable with respect to the yaw plate 50 so that the chordwise position at which they come in contact with the blade may be adjusted. The stop 78 may be also adjusted vertically so as to properly position the rotor blade with respect to the yaw plate. These adjustments are necessary so that the different reference lines for different blade models may be taken into account. Once the rotor blade has been properly angularly and translationally positioned with respect to the yaw plate it is secured thereto by adjusting stop 80 so as to bring it securely in contact with the rotor blade 2.

For each particular blade design there will be particular predetermined reference points to which the blade is to be adjusted. Generally speaking the pitch axis of the blade will be properly positioned with respect to the yaw plate while at the same time the chord line of the blade is positioned at a proper angle with respect to the yaw plate. The locations of these reference points may vary depending upon the particular blade design being examined and the particular embodiment of the invention which is being utilized. Additionally, there is a degree of arbitrariness regarding the particular references being used. However, it is important that once a reference is selected for a particular design that it be held fixed and constant. Although the stops 74 and 78 are shown adjustable to accommodate different designs, they could be designed to be replacable so that there would be a different pair of stops for each blade design. Such reference points are easily determined and their selection is well within the capabilities of those skilled in the art.

As has been previously indicated many different types of measuring apparatus may be used in conjunction with the present invention. The transducers which measure the relative displacement of the horizontal carriage with respect to the trolley 20 and the relative displacement of the vertical carriage 40 with respect to the horizontal carriage 30 are substantially the same as shown in the schematic drawings previously described and are therefore not shown on the drawings of the preferred embodiment. The position of the horizontal carriage 30 along the track 12 will be determined visually through the use of a scale attached to the base 6, although as previously mentioned transducers could be used for that purpose also, if desired.

The upper and lower contours of the blade 2 are measured by transducer assemblies 82 and 84, respectively. Transducer assemblies 82 and 84 are substantially identical to one another except that they are of opposite configurations. Accordingly, only transducer assembly, 82 will be described.

Figure 9:
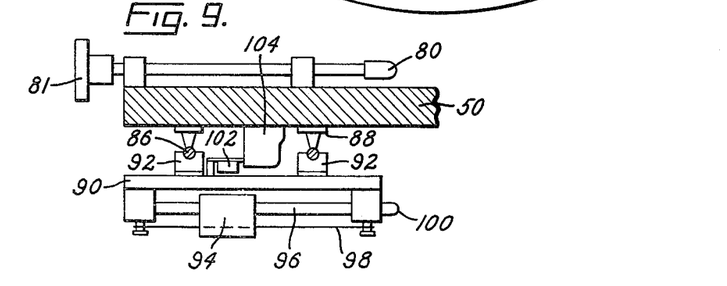
FIG. 9 is a section view taken along line 9—9 in FIG. 8.

The transducer assembly 82 may be best seen in FIGS. 8 and 9. The transducer assembly 82 is mounted to tracks 86. Tracks 86 are secured to the yaw plate 50 by supports 88. A platform 90 is secured to the rails by guides 92. A linear transducer 94 is slidably mounted to a rail 96 which is in turn slidably mounted to platform 90. The rail 96 is mounted to platform 90 by keys not shown. The keys prevent the rail and hence the transducer from rotating. A scale 98, which is slidably engaged by the linear transducer 94 is, also securely mounted to the platform 90. A probe 100 is formed at the end of the rail 96, or is connected thereto. The probe 100 will thus move the linear transducer 94 with respect to the scale 98 as it is passed over the surface of the blade. From the measurements thus attained, the distance points on the surface of the rotor blade are from the chord line, or other reference line, may be determined.

Another transducer 102 is connected to the platform 90. The transducer 102 slidably engages a scale or vernier 104 which is connected to the yaw plate 50. The transducer 102 provides information from which the chordwise location of the probe 100 can be determined.

It may thus be seen that as probe 100 is passed over the surface of the blade 2 transducers 94 and 102 provide sufficient information locate points on the blade surface. This information taken with similar information obtained from transducer assembly 84 on blade's lower surface will enable a complete description of the blade's contour to be determined.

The transducers used in the preferred embodiment are Model EL500 kits manufactured by Metra-Tech Industries, Inc. of Easton, Md. Such transducers are accurate to 0.0002 inches per foot. The units are of the type heretofore described wherein a photoelectric cell and coder is used to count spaced etched marks on a scale. Although transducers of the type just described are used in the preferred embodiment it is to be specifically understood that any appropriate type of distance measuring equipment may be used without departing from the spirit of the invention herein described. Other methods or apparatus for determining distance may include visually noting the position of a pointer along a scale to strain gage and other sophisticated types of measuring equipment.

It is desirable that a degree of adjustability be incorporated into the fixture so that rotor blades of various designs may be measured and checked without the necessity of another fixture being constructed. As has been previously mentioned it was for this reason that stops 74 and 76 were made adjustable. The rotor blade tip support 10 is mounted on the tracks 12 for this reason also. This enables rotor blades of varying span to be used with the fixture. It is contemplated that different yaw plates 50 of different size, may be used with the fixture. Thus, rotor blades having a chord length beyond the capability of a particular yaw plate 50 may be accommodated. In this manner the versatility of a particular fixture is substantially increased.

In order to insure proper readings when checking a series of rotor blades of the same design it is important that each blade be properly positioned in the fixture. The proper orientation of the yaw plate 50 to the rotor blade 2 has previously been described. It is equally important that the rotor blade 2 be properly oriented to the remaining components of the fixture so that proper measurements of twist, chordwise and spanwise bow are obtained.

Although the present invention has been described with reference to the particular embodiment herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. An apparatus for determining the contours of a rotor blade having a pitch axis and having a multiplicity of airfoil sections along its span which comprises:
    a frame adapted to be detachably connected to a predetermined airfoil section along the span of the rotor blade, the airfoil sections including a reference line passing substantially from the leading edge to the trailing edge of the airfoil, said frame being adapted to pivot about a line which is substantially coincident with the rotor blade pitch axis to enable said frame to be aligned with said reference line;
    a first measuring means connected to said frame for determining the distance a preselected point on the surface of the rotor blade is located from the leading edge of said airfoil section along a line parallel to said reference line; and
    a second measuring means connected to said frame for determining the distance said preselected point is located from said reference line along a line perpendicular to said reference line.

2. The apparatus of claim 1 wherein:
    said first measuring means is adapted so as to permit it to move with respect to the airfoil section along a line substantially parallel to said reference line; and
    said second measuring means is adapted so as to permit it to move with respect to said airfoil section along a line substantially parallel to said line perpendicular to said reference line; thereby permitting the determination of the location of a multiplicity of points along the surface of the airfoil thus determining its contour.

3. The apparatus of claim 2 wherein said second measuring means is slidably connected to said first measuring means.

4. The apparatus of claim 2 which further includes:
    a base having means for supporting the rotor blade;
    a trolley, slidably connected to said base, having said frame connected thereto, said trolley being adapted to move along the span of the blade, thereby permitting said frame to be positioned at preselected airfoil sections along the span of the blade.

5. The apparatus of claim 1 which further includes:
    a base having means for supporting the rotor blade;
    a trolley, slidably connected to said base, having said frame connected thereto, said trolley being adapted to move along the span of said blade, thereby permitting said frame to be positioned at preselected airfoil sections along the span of the blade.

6. The apparatus of claim 5 which further includes a third measuring means connected to said base for measuring the distance said frame is located from a second preselected reference point along a line substantially parallel to the rotor blade pitch axis.

7. The apparatus of claim 6 wherein said frame is pivotally connected to said trolley to permit said frame to pivot with respect to said trolley about a line which is substantially coincident with the rotor blade pitch axis.

8. The apparatus of claim 7 which further includes a fourth measuring means connected to said trolley for measuring the magnitude of the angular rotation of said frame with respect to said trolley from a third predetermined reference point, thereby permitting the magnitude of the angle of said reference line to a predetermined reference line located in a plane parallel to the airfoil section chord plane to be determined.

9. The apparatus of claim 8 which further includes means for permitting said frame to move with respect to said trolley, connected to said frame and to said trolley, along a vertical line.

10. The apparatus of claim 9 which further includes a fifth measuring means connected to said trolley for measuring the distance said frame has moved vertically, thereby permitting a determination of the magnitude of the chordwise bow of the rotor blade.

11. The apparatus of claim 9 which further includes means for permitting said frame to move horizontally with respect to said trolley, connected to said frame and to said trolley.

12. The apparatus of claim 11 which further includes a sixth measuring means connected to said trolley for measuring the distance said frame has moved horizontally, thereby permitting a determination of the magnitude of the flapwise bow of the rotor blade.

13. An apparatus for determining the contours of a rotor blade having a pitch axis, a multiplicity of airfoil sections along its span wherein each airfoil section has a reference line passing substantially from the leading edge to the trailing edge which comprises:

a base having means for supporting the rotor blade;

a frame adapted to be detachably connected to a predetermined airfoil section along the span of the rotor blade;

a trolley slidably connected to said base for movement along the span of the rotor blade and having said frame connected thereto by means permitting, said frame to pivot with respect to said trolley about a line which is substantially coincident with the rotor blade pitch axis, said frame to move vertically with respect to said trolley said frame to move horizontally with respect to said trolley a first measuring means connected to said frame so as to permit it to move with respect to the airfoil section in a direction substantially parallel to said reference line, for determining the distance a preselected point located on the surface of the airfoil is located from the leading edge of said airfoil section along a line parallel to said reference line;

a second measuring means connected to said frame for determining the distance said preselected point is located from said reference line along a line perpendicular to said reference line, said second measuring means being connected to said frame so as to permit it to move with respect to said airfoil section along a line substantially paralled to said line perpendicular to said reference line, thereby permitting the determination of the location of a multiplicity of points along the surface of the airfoil thus determining its contour;

a third measuring means connected to said base for measuring the distance said frame is located from a preselected reference point along a line substantially parallel to the rotor blade pitch axis;

a fourth measuring means connected to said trolley for measuring the magnitude of the angular rotation of said frame with respect to said trolley from a predetermined reference line, thereby permitting the magnitude of the angle of said reference line of said airfoil section to said predetermined reference line to be determined;

a fifth measuring means connected to said trolley for measuring the distance said frame has moved vertically a predetermined point along said reference line of said, thereby permitting a determination of the chordwise bow of the rotor blade; and a sixth measuring means connected to said trolley for measuring the distance said frame has moved horizontally to a predetermined point along a line perpendicular to, thereby permitting a determination of the magnitude of the flapwise bow of the rotor blade.

* * * * *